Dec. 4, 1956    J. LASSITER    2,772,832
ROW CROP METER

Filed July 1, 1955    2 Sheets-Sheet 1

Jesse Lassiter
INVENTOR.

BY
Attorneys

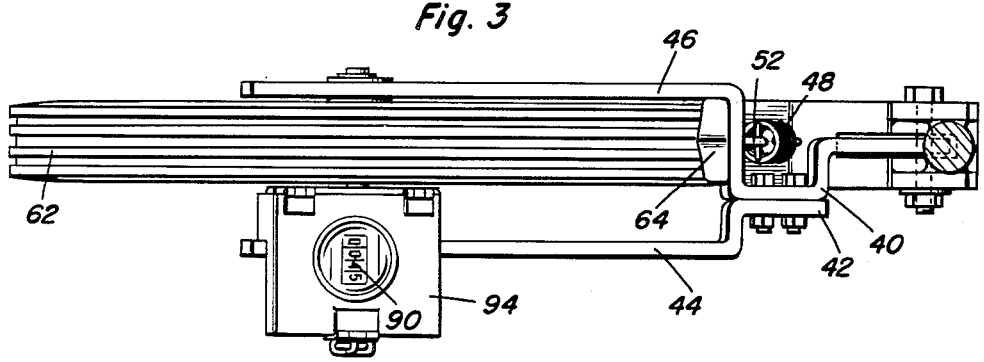
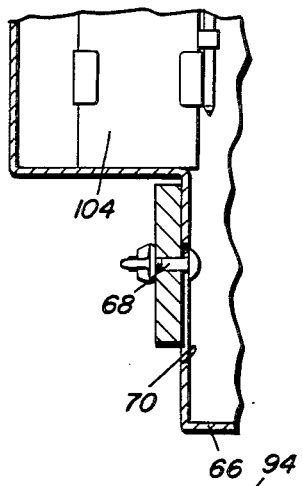
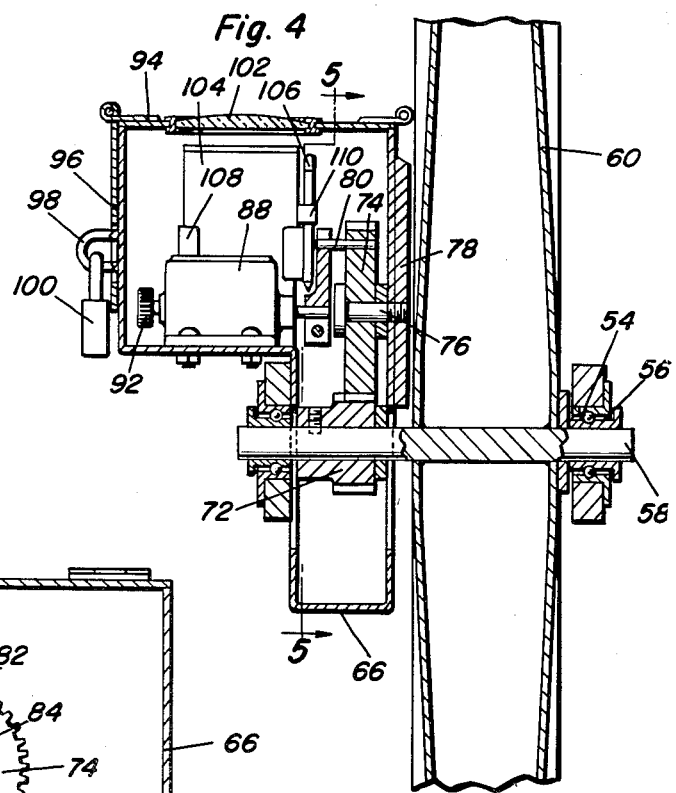
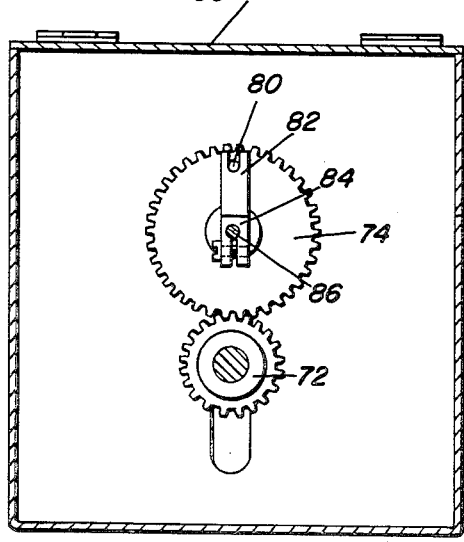

United States Patent Office 2,772,832
Patented Dec. 4, 1956

2,772,832

ROW CROP METER

Jesse Lassiter, Four Oaks, N. C.

Application July 1, 1955, Serial No. 519,425

3 Claims. (Cl. 235—95)

This invention generally relates to a measuring device, and more specifically provides a device for measuring areas in combination with agricultural implements for the purposes of determining and recording accurately the area affected by the particular agricultural implement.

An object of the present invention is to provide a row crop meter wherein the device is especially adapted for measuring acreage of all types of row crops and to facilitate the measurement of such acreage.

In recent years, various types of crops, and especially row crops, have been so regulated with the acreage allotted to the various farmers being controlled. If more than the allotted acreage is planted, the excess acreage must be destroyed or certain penalties will be exacted in accordance with the amount of overplanting. Therefore, it is desirable to neither underplant or overplant, and accordingly, it is an important object of the present invention to provide a row crop meter which will accurately measure and indicate the exact acreage being planted, cultivated or the like, thereby facilitating the compliance with the acreage allotments and simplifying fertilizer distribution, seed distribution and determining other pertinent factors concerned with crop raising.

Another object of the present invention is to provide a row crop meter which is disposed immediately behind the steerable wheel or wheels of a tractor wherein the meter will be accurate during movement across a rough or plowed field.

A further object of the present invention is to provide a row crop meter in accordance with the preceding objects which includes a rotatable ground engaging wheel that is spring urged into contact with the ground and mounted on the cultivator tool bar wherein raising of the tool bar will disengage the wheel from the ground and further employing means to brake the ground engaging wheel immediately after it leaves the ground to prevent accidental rotation of the ground engaging wheel due to momentum thereof when the wheel is raised from the ground.

Other objects of the present invention reside in its simplicity of construction, ease of attachment to various types of farm implements, accuracy, ease of readability, adaptation for its particular purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a plan sectional view taken substantially upon a plane passing along section line 3—3 of Figure 1 illustrating the various details of the structural arrangement of the present invention;

Figure 4 is a detailed sectional view taken substantially upon a plane passing along section line 4—4 of Figure 2 illustrating the internal construction of the drive mechanism for the indicator;

Figure 5 is a detailed sectional view taken substantially upon a plane passing along section line 5—5 of Figure 4 illustrating the gear arrangement for driving the indicator; and Figure 6 is a detailed sectional view illustrating the mounting means for the indicator and the housing therefor.

Figure 1:
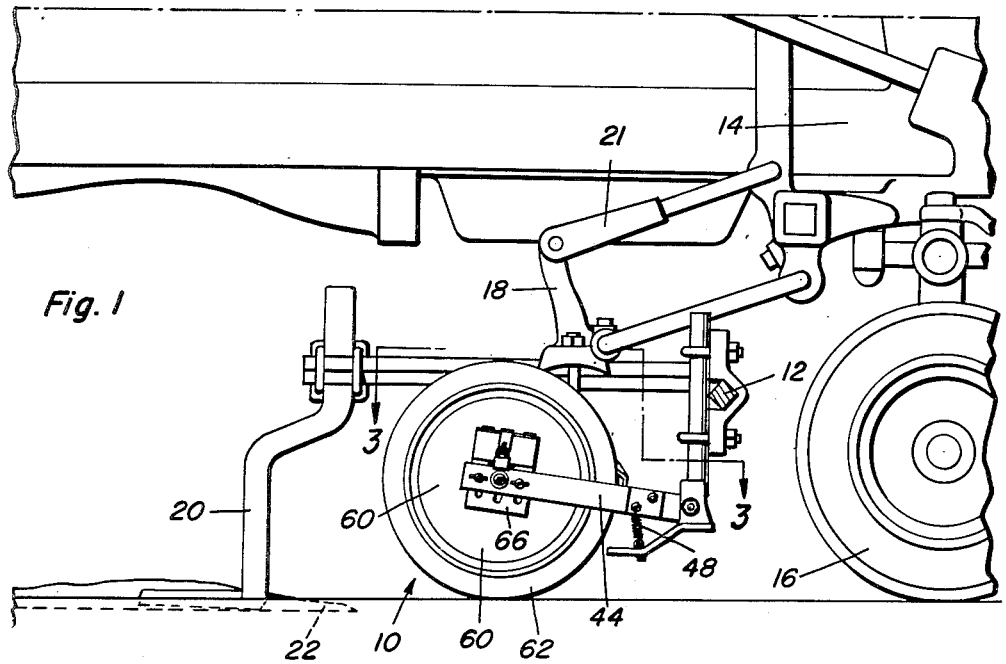
Figure 1 is a side elevational view of the row crop meter of the present invention mounted on a transversely disposed tool bar on a tractor with the ground engaging wheel disposed immediately to the rear of the tractor front wheel.
Figure 2:
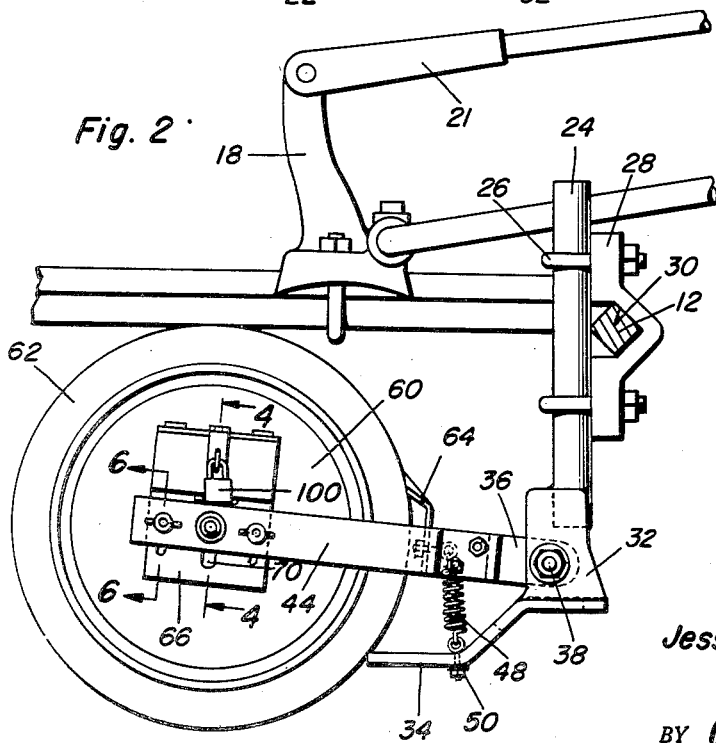
Figure 2 is an enlarged elevational view of the far side of the row crop meter.

With reference to the official drawings, the numeral 10 generally designates the row crop meter of the present invention for attachment to a transverse tool bar 12 supported transversely beneath the central portion of a tractor 14 rearwardly of the steerable wheels 16. The tool bar 12 is supported from a supporting bracket 18 mounted on lift link members 20 for vertical bodily movement wherein the tool bar 12 may be lifted or lowered as desired by the operator of the tractor. The tool bar 12 also supports a depeding support member 20 having a cultivator 22 or the like on the bottom thereof. It will be understood that the row crop meter of the present invention may be employed with various types of farm implements, and the cultivator 22 is illustrated for the purposes of explanation.

A vertically disposed cylindrical rod 24 is attached to the tool bar 12 by a pair of U-bolts 26 which extend through a clamp plate 28 having a recessed portion 30 for receiving the tool bar 12 thereby rigidly and securely fastening the vertical rod 24 to the tool bar 12.

Disposed at the bottom of the vertical rod 24 is a pair of spaced depending plates 32 having a forwardly extending and downwardly offset braking portion 34 at the bottom end thereof. Pivotally secured between the plate 32 is a forwardly extending strap member 36 attached to the plates 32 by a pivot bolt 38.

The strap member 36 is provided with an offset portion 40 to which is joined a second strap member 42 wherein the strap members 36 and 42 project forwardly in spaced parallel relation and form legs 44 and 46 of a yoke wherein the yoke is pivotally attached to the plates 32. A tension coil spring 48 is connected to an eye bolt 50 on the offset portion 34 of the plates 32 at one end and to an eye bolt 52 on the strap member 36 at the other end thereof for urging the yoke towards the offset portion 34 of the plates 32.

Each of the legs 44 and 46 is provided with an aperture 54 adjacent the outer end thereof having a bearing member 56 disposed therein receiving a transverse axle 58 which is secured to the disk portions 60 of a ground engaging tire or wheel 62, thereby permitting rotation of the axle 58 and the wheel 62 in relation to the leg members 44 and 46. The spring 48 is arranged for urging the ground engaging wheel 62 downwardly into contact with the ground engaging surface.

Upstanding from the leg member 36 is a forwardly bent plate 64 forming a scraper for frictional engagement with the ground engaging wheel 62 for scraping excess dirt from the wheel during operation thereof. The spring 48 also urges the wheel 62 into engagement with the braking portion 34 of the plates 32 when the tool bar 12 is raised for disengaging the wheel 62 from the ground surface, thereby preventing rotation of the wheel 62 due to momentum or for any other reason.

The wheel 62 is of a known diameter, and by counting the revolutions of the wheel in certain proportions, the acreage covered by the wheel 62 may be determined when the distance between adjacent rows of crops is known.

A housing 66 is supported on the leg member 44 by a pair of fastening bolts 68 extending through slots 70 in one side thereof for adjusting the housing in relation to the axle 58. Disposed within the housing 66 and mounted rigidly on the axle 58 is a drive pinion gear 72 which is in meshing engagement with a driven gear 74 mounted on a stub axle 76 mounted in a reinforced portion 78 of the casing 66. The gear 74 is larger in diameter than the gear 72 for reducing the rotational speed thereof and is provided with a projecting peg 80 extending from the outer face thereof.

The peg 80 is received in the U-shaped outer end 82 of an arm 84 mounted on the shaft 86 of a counter 88 which has movable numerical indicia 90 movable in accordance with rotation of the shaft 86 thereof for registering the area covered by the wheel 62. The counter 88 is provided with a reset knob 92 to set the numerical indicia at zero or any suitable base number from which a particular area will be determined by reading the indicia initially and finally.

The casing 66 is provided with a pivotal opening 94 that is secured in closed position by a hasp 96 positioned over a U-shaped keeper 98 having a lock 100 extended therethrough for retaining the closure 94 in position thereby assuring that the counter 88 will not be moved by unauthorized persons. Also, the closure 94 is provided with a glass viewing area 102 to permit reading of the indicia 90 without disengaging the lock 100. Also, a pad 104 and a pencil 106 may be provided within the casing 66 for writing down the particular readings of the indicia 90. The pad 104 may be retained by clips 108 and the pencil also may be retained by other clips 110.

The particular driving arrangement permits variation in the relative sizes of the gears inasmuch as the casing 66 may be adjusted in relation to the axle 58, thereby permitting adjustment in the relationship between the indicia 90 and the rotation of the wheel 62.

The row crop meter of the present invention is constructed in such a manner that when the cultivators are lowered, the ground engaging wheel is pressed against the soil with spring tension from 50 to 100 pounds. When the cultivators are raised, the ground engaging wheel is pressed against the braking plate by spring tension which will prevent accidental turning of the wheel and cause erroneous measurements. The wheel runs directly in the center of the packed track made by the front tractor wheel in as close proximity as feasible and with a given diameter of wheel, and a given distance between adjacent rows, the reading may be direct for determining the area cultivated. A conversion table may be provided for converting the meter readings to actual acres wherein the row widths are other than the normal standards.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A row crop meter adapted to be attached to a farm implement tool bar comprising a bracket, a yoke extending from said bracket, a ground engaging wheel journaled on said yoke, said yoke being pivotally attached to said bracket, spring means urging said wheel into engagement with the ground surface, an indicating counter mounted on said yoke, means interconnecting the counter and wheel for registering the rotation of the wheel, said wheel adapted to be mounted closely behind and in the path of movement of a tractor wheel whereby the wheel will engage the packed track of the tractor wheel for providing an accurate reading, a scraper mounted on said yoke in closely spaced relation to the wheel for removing excessive soil therefrom, a braking bar disposed adjacent the periphery of said wheel below the horizontal center line thereof, said spring means urging said yoke and wheel downwardly into engagement with the braking bar when the bracket and wheel are raised.

2. A row crop meter adapted to be attached to a farm implement tool bar comprising a bracket, a yoke extending from said bracket, a ground engaging wheel journaled on said yoke, said yoke being pivotally attached to said bracket, spring means urging said wheel into engagement with the ground surface, an indicating counter mounted on said yoke, means interconnecting the counter and wheel for registering the rotation of the wheel, said wheel adapted to be mounted closely behind and in the path of movement of a tractor wheel whereby the wheel will engage the packed track of the tractor wheel for providing an accurate reading, a scraper mounted on said yoke in closely spaced relation to the wheel for removing excessive soil therefrom, a braking bar disposed adjacent the periphery of said wheel below the horizontal center line thereof, said spring means urging said wheel into engagement with the braking bar when the bracket and wheel are raised, said interconnecting means including a pair of gears transferring the rotation of said wheel to the counter, a projecting pin on one of said gears, an arm on a shaft in the counter for engaging said pin, said counter and interconnecting means being disposed within a housing for preventing entry of dust, and a viewing glass in said housing for observing said counter, and a lockable closure permitting entry into the housing for setting the counter.

3. An area measuring meter adapted to be attached to a wheeled farm tractor having a liftable transverse tool bar for supporting a farm implement, said meter comprising a bracket adjustably and removably supported on the tool bar and depending therefrom, a rearwardly extending braking bar rigid with said bracket, a rearwardly extending yoke pivotally mounted on said bracket at a point above the braking bar, a measuring wheel journaled on said yoke for engaging the ground surface, said wheel being disposed in spaced relation to the braking bar when the wheel is in contact with the ground surface, an indicating counter mounted on said yoke, drive means interconnecting the wheel and counter for directly indicating the area traversed by the farm implement, said measuring wheel being mounted directly behind a wheel on the tractor thereby engaging the measuring wheel with a smooth surface, spring means interconnecting the yoke and braking bar in spaced relation to the point of attachment of the yoke for urging the rear end of the yoke downwardly thus urging the measuring wheel downwardly into contact with the ground surface, said braking bar having a rear end disposed below a horizontal plane passing through the center of the measuring wheel and in closely spaced relation thereto when the tool bar, farm implement and measuring wheel are in a lowered position whereby the periphery of the measuring wheel will immediately engage the free end of the braking bar as the tool bar, farm implement and measuring wheel are elevated thus assuring an accurate measurement of the area traversed by the farm implement.

References Cited in the file of this patent
UNITED STATES PATENTS

| 289,266 | Hyatt | Nov. 27, 1883 |
| 685,150 | Keys | Oct. 22, 1901 |
| 2,327,657 | Middleton | Aug. 24, 1943 |